United States Patent
Hajewski et al.

(10) Patent No.: US 11,929,901 B2
(45) Date of Patent: Mar. 12, 2024

(54) INFRASTRUCTURE-AGNOSTIC PERFORMANCE OF COMPUTATION SEQUENCES

(71) Applicant: Salesforce, Inc., San Francisco, CA (US)

(72) Inventors: Jeffrey Hajewski, North Liberty, IA (US); Victor Spivak, San Mateo, CA (US); Alexander Oscherov, Danville, CA (US); Stefan Derdak, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/237,582

(22) Filed: Apr. 22, 2021

(65) Prior Publication Data

US 2022/0345390 A1    Oct. 27, 2022

(51) Int. Cl.
*H04L 43/0888*   (2022.01)
*H04L 67/60*     (2022.01)

(52) U.S. Cl.
CPC ......... *H04L 43/0888* (2013.01); *H04L 67/60* (2022.05)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |

(Continued)

*Primary Examiner* — June Sison
(74) *Attorney, Agent, or Firm* — Kwan & Olynick LLP

(57) ABSTRACT

System and methods are described for performing sequences of computations in an infrastructure-agnostic manner. In one implementation, a method comprises: receiving a dispatch request for executing a user-defined pipeline; computing a performance metric based on the dispatch request; and determining, based at least partially on the performance metric, whether to execute the user-defined pipeline locally by the pipeline engine or transmit the dispatch request back to the network adapter.

17 Claims, 7 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2016/0103914 A1* | 4/2016 | Im .................. G06F 16/951 707/770 |
| 2017/0262298 A1* | 9/2017 | Frank .................. G06F 8/65 |
| 2018/0052861 A1* | 2/2018 | Seetharaman ........ G06F 16/435 |
| 2018/0316735 A1* | 11/2018 | Yang .................. G06F 11/3089 |
| 2019/0138367 A1* | 5/2019 | Bishop .................. G06F 9/5083 |
| 2021/0374602 A1* | 12/2021 | Zhang .................. G06F 16/254 |

\* cited by examiner

(12) United States Patent

INFRASTRUCTURE-AGNOSTIC PERFORMANCE OF COMPUTATION SEQUENCES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate to distributed storage and data processing systems, and, more specifically, to performing sequences of computations in a distributed computation environment.

BACKGROUND

Distributed computing systems utilize multiple components located on different machines to coordinate actions in a manner that appears as a single coherent system to end-users. In current systems, users must either choose an idiom of computation (e.g., a map-reduce model) or a communication idiom (e.g., streaming data). In either of these settings, the user must understand the architecture in which they will be operating. For example, with a map-reduce model, the user must understand how the map-reduce model operates and how to structure their solutions to fit this model. As a result, the user must spend a significant amount of time becoming familiar with the architecture and its idioms. Moreover, current systems suffer from scale limitations that require that all components scale up or down together, rather than individual components scaling independently.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Figure 1A:
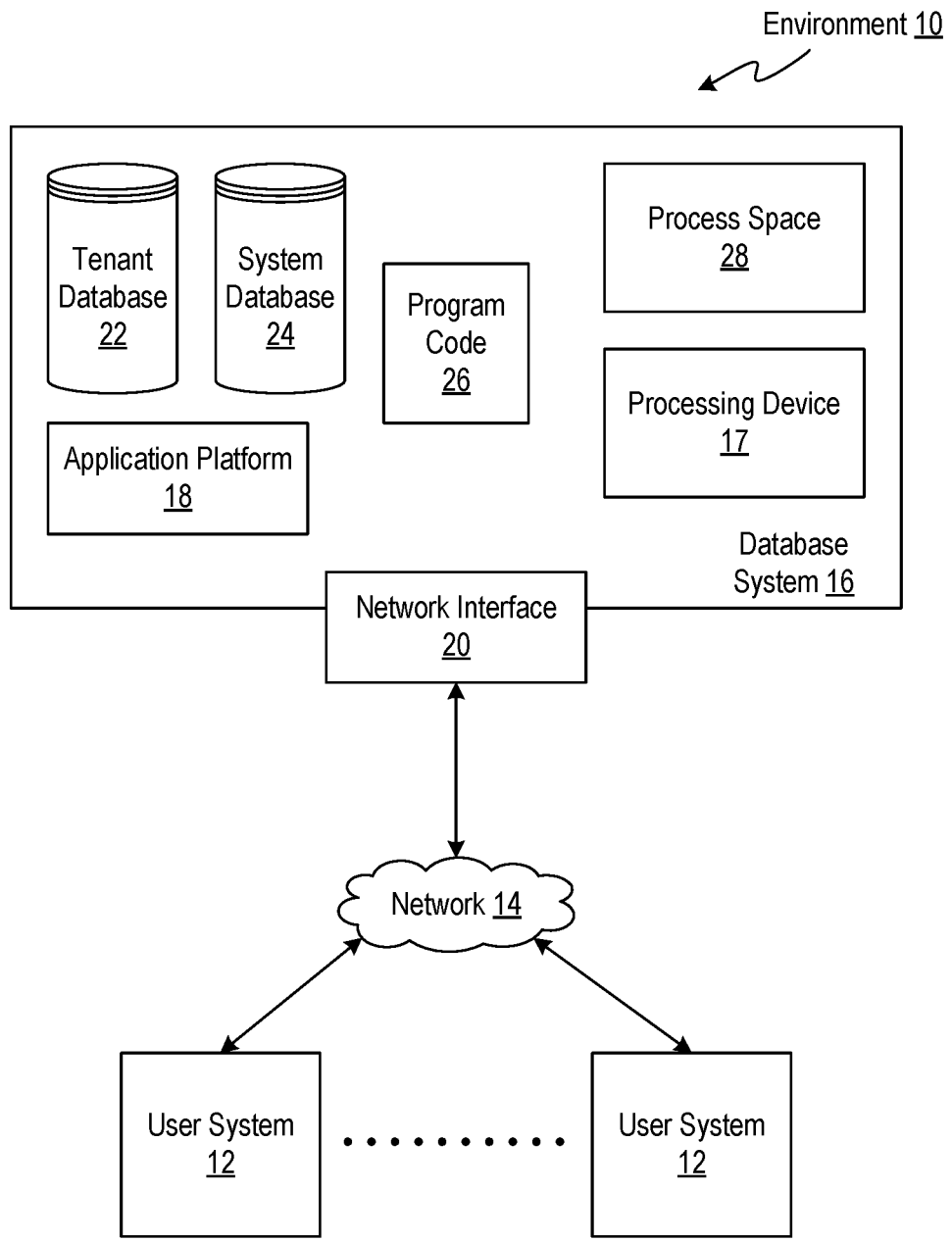
FIG. 1A shows a block diagram of an example environment in which an on-demand database service can be used according to some implementations.

The implementations described herein relate to systems and methods for performing sequences of computations in a distributed computation environment in an architecture-agnostic manner. Specifically, the systems and methods utilize a pipeline engine that abstracts both the computational definition layer and the network layer. At the user end, a user defines a series of computations to be evaluated independent of a computational idiom, such as the map-reduce model, and without specifying an underlying computational infrastructure on which the computations will be executed. The pipeline engine, which receives a request to execute the pipeline, can make a determination as to whether the pipeline should be executed locally, or whether the pipeline should be executed by a different device on the network. The determination may be made based on comparisons drawn between local execution speed and distributed execution speed derived from, for example, measures of network latency. Moreover, the pipeline engine may utilize external resources, such as databases or deep learning frameworks, to improve or optimize local performance. This allows the user to focus on the computational problem itself without requiring the user to specify how the computation is run or distributed across the network.

In an example implementation, the user first specifies one or more series of computations (each referred to as a "stage"). If the user provides more than one stage, they further provide a routine for serializing or deserializing the data that flows between the stages. The collection of stages is referred to herein as a "pipeline." In such implementations, the user may provide the following information, which may be the minimum information provided: a stage-wise computation and a method for serializing and deserializing the data (where serialization and deserialization routines, collectively referred to as "serialization routines," are used between stages, or at the beginning and end of the pipeline, to format data appropriately). The user may structure computations however they wish, including how to ingest data, filter data, map data, apply functions to the data, and transmit the data for storage or further use. The user need not understand how the data is transmitted between stages, nor specify how the data is transmitted. The user may further build a network adapter (or use a pre-built network adapter) that handles the underlying network infrastructure and communication requirements. This allows a given pipeline to be executable on any distributed system infrastructure, such as Hadoop or Spark, a Kafka topology, a Storm topology, etc.

The implementations described herein address the various limitations of current systems by providing a distributed system framework for which the idiom of computation is specified/defined by the user, rather than specified/defined by the infrastructure, and the infrastructure can be adapted for any style of network communication. For example, Apache Hadoop and Apache Spark require the user to decompose their problem into a map-reduce style idiom where data is transformed in some manner and then reduced to a singular value or values. In between each step of computation, the user may need to specify how to group their data, and are required to use specific serialization formats. Similarly, other approaches, such as Apache Kafka and Apache Storm, restrict how computations are coordinated across nodes, often resulting in high network overhead. The present implementations provide the user freedom as to both the specific serialization formats they wish to use, and do not restrict how computations are coordinated.

Other platforms, such as Apache Beam, utilize a domain-specific language, where computations and functions specified by the user are translated to be compatible with other platforms. Certain implementations of the present disclosure utilize a pipeline engine that executes computations directly without performing any translations. Moreover, the pipeline engine itself can be adapted to run on various platforms.

In some implementations, a number of delegate objects are provided to the user-defined pipeline that allow for the pipeline to interact with external resources during execution. Delegate objects can operate as a type of plugin infrastructure that allows system maintainers to make optimizations when using external resources (such as databases, deep learning frameworks, or other services), such as batching and queuing requests to improve throughput, as well as send requests to specialized hardware without the user being aware or requiring such at the time they request to have the pipeline executed.

Advantages of the implementations of the disclosure over current systems include, but are not limited to: (1) users need not spend time or resources restricting themselves to particular computational idioms; (2) users are not required to follow any particular communication patterns (e.g., streaming or batched communication); (3) the system may scale individual pieces corresponding to specific stages of the user-defined pipeline independently from the rest of the system, rather than scale all components of the system in an "all-or-nothing" fashion; (4); computations may be executed directly by a pipeline engine without translating the computations for execution on different computational platforms; (5) the user need not specify or be concerned with the underlying infrastructure used, and the system may switch the infrastructure without requiring additional user input; and (6) the pipeline engine can determine whether to execute pipelines locally or have the pipeline executed by a different device and/or on a different infrastructure based on an evaluation of various performance networks.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as an "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "executing," "generating," "processing," "reprocessing," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," "mapping," "causing," "storing," "prioritizing," "queuing," "managing," "serializing," "deserializing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (which is a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the database system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the database system 16, is a service that is made available to users outside an enterprise (or enterprises) that owns, maintains, or provides access to the database system 16. An "enterprise" refers generally to a company or organization that owns one or more data centers that host various services and data sources. A "data center" refers generally to a physical location of various servers, machines, and network components utilized by an enterprise.

As described above, such users generally do not need to be concerned with building or maintaining the database system 16. Instead, resources provided by the database system 16 may be available for such users' use when the users need services provided by the database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of the database system 16 to execute, such as the hardware or software infrastructure of the database system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the database system 16 implements a web-based customer relationship management (CRM) system. For example, in some such implementations, the database system 16 includes application servers configured to implement and execute CRM software applications as well as provide related data, code, forms, renderable web pages, and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The database system 16 also implements applications other than, or in addition to, a CRM application. For example, the database system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the database system 16.

According to some implementations, each database system 16 is configured to provide web pages, forms, applications, data, and media content to user (client) systems 12 to support the access by user systems 12 as tenants of the database system 16. As such, the database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS) or a relational database management system (RDBMS), as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with the database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between the database system 16 and the network 14, but other techniques can be used in addition to or instead of these techniques. In some implementations, the network interface 20 between the database system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, personal digital assistant (PDA), or other wireless device, allowing a user (for example, a subscriber of on-demand services provided by the database system 16) of the user system 12 to access, process, and view information, pages, and applications available to it from the database system 16 over the network 14.

Each user system 12 also typically includes one or more user input devices, such as a keyboard, a mouse, a trackball, a touch pad, a touch screen, a pen or stylus, or the like, for interacting with a GUI provided by the browser on a display (for example, a monitor screen, liquid crystal display (LCD), light-emitting diode (LED) display, etc.) of the user system 12 in conjunction with pages, forms, applications, and other information provided by the database system 16 or other systems or servers. For example, the user interface device can be used to access data and applications hosted by database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the database system 16, that user system can have the capacities allotted to the salesperson. However, while an administrator is using that user system 12 to interact with the database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as an Intel Pentium® processor or the like. Similarly, the database system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The database system 16 includes non-transitory computer-readable storage media having instructions stored thereon that are executable by or used to program a server or other computing system (or collection of such servers or computing systems) to perform some of the implementation of processes described herein. For example, the program code 26 can include instructions for operating and configuring the database system 16 to intercommunicate and to process web pages, applications, and other data and media content as described herein. In some implementations, the program code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, DVDs, CDs, microdrives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known.

Figure 1B:
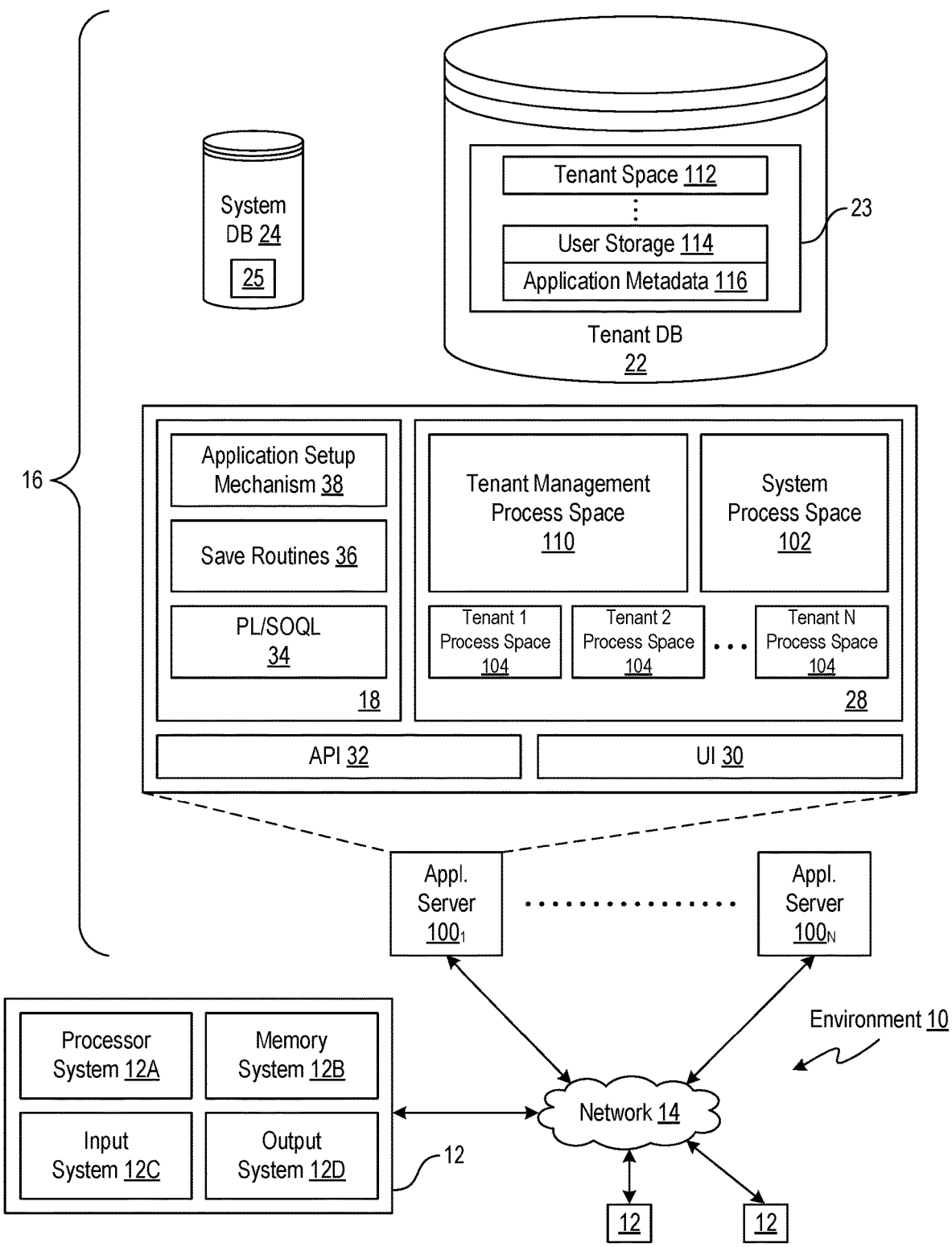
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the database system 16 and various interconnections between such elements are shown with more specificity according to some more specific implementations. In some implementations, the database system 16 may not have the same elements as those described herein or may have other elements instead of, or in addition to, those described herein.

In FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server," is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114, and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The database system 16 also includes a user interface (UI) 30 and an application programming interface (API) 32. The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using PL/SOQL 34, which provides a programming language style interface extension to the API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_2$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the database system 16. However, it will be apparent to one skilled in the art that other transport protocols can be used to optimize the database system 16 depending on the network interconnections used.

In some implementations, each application server 100 is configured to handle requests for any user associated with any organization that is a tenant of the database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the database system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the database system 16. Such requests and updates can involve sending one or more queries to tenant database 22 or system database 24. The database system 16 (for example, an application server 100 in the database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
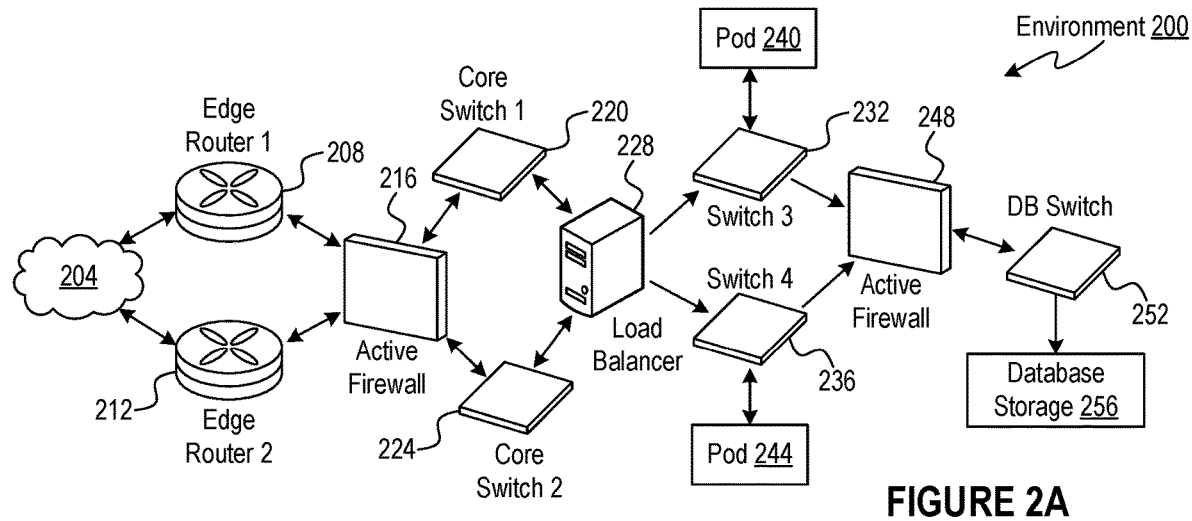
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
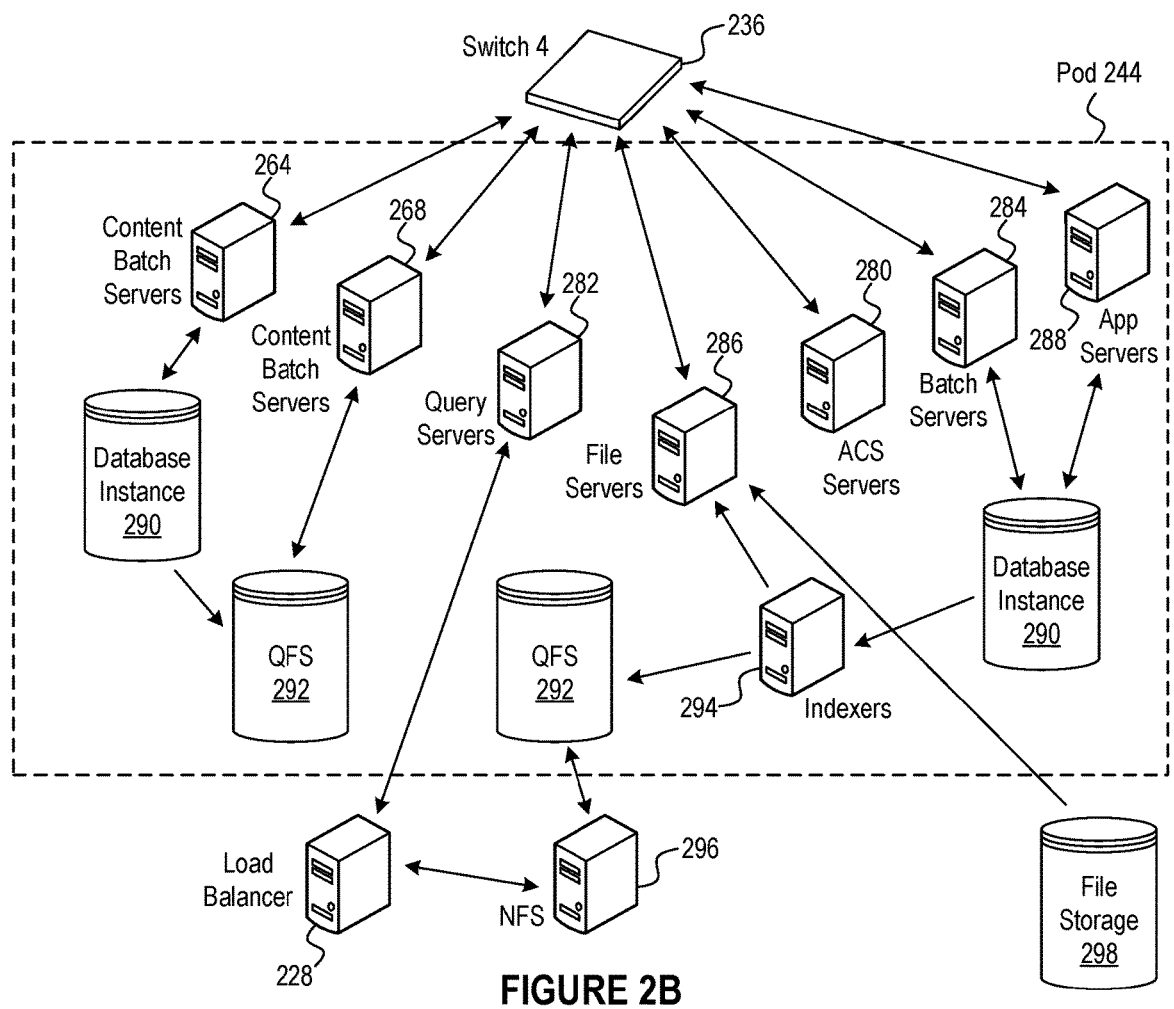
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of Internet Protocol (IP) networks or 'prefixes,' which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example, via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as SQL injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the pod switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and binary large objects (BLOBs). By managing requests for information using the file servers 286, the image footprint on the database can be reduced. The query servers 282 can be used to retrieve information from one or more file systems. For example, the query servers 282 can receive requests for information from the app servers 288 and transmit information queries to the network file systems (NFS) 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems, Inc. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the NFS 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database instance 290 or QFS 292. The index information can be provided to the file servers 286 or the QFS 292.

Figure 3:
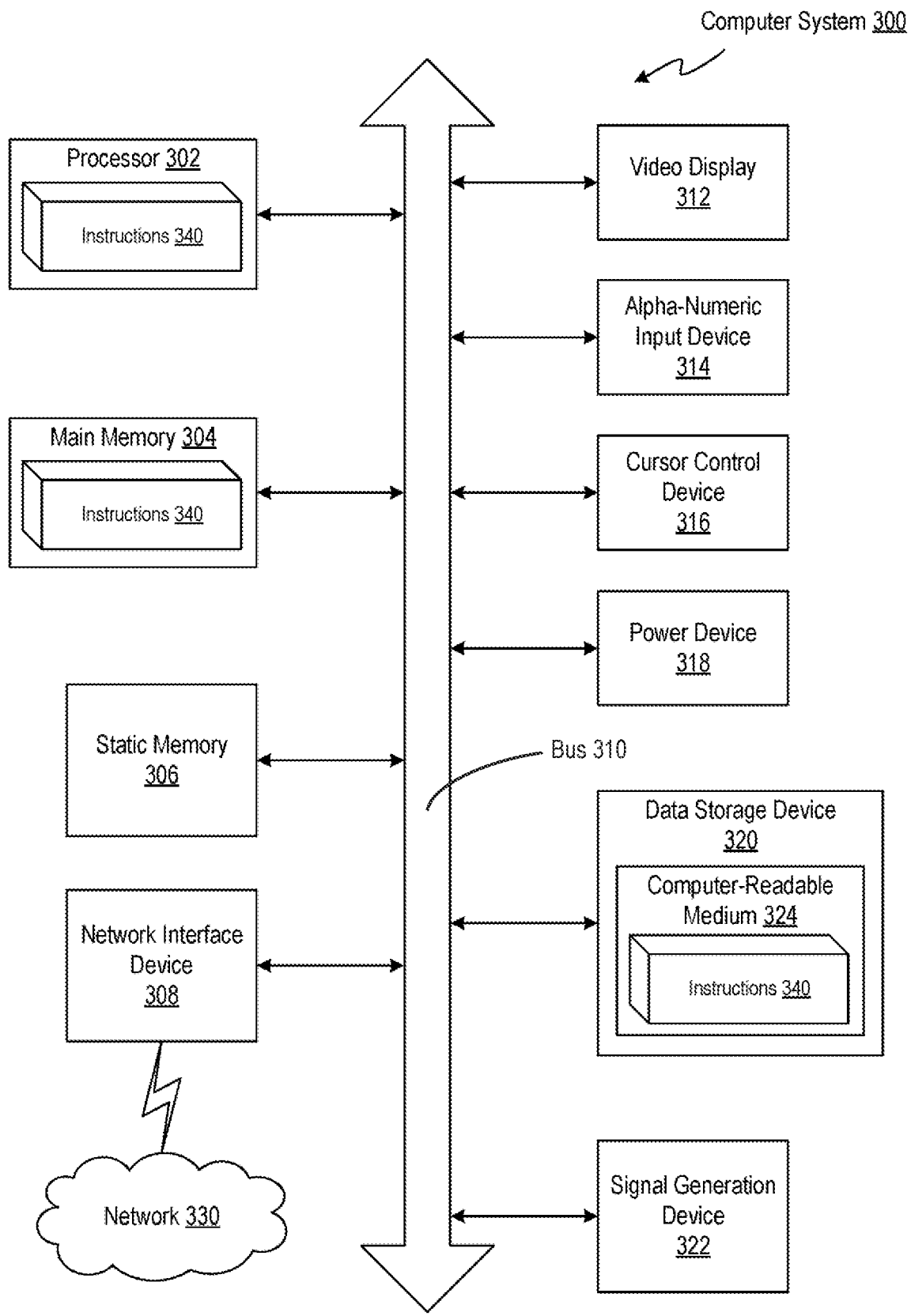
FIG. 3 illustrates a diagrammatic representation of a machine in the exemplary form of a computer system within which one or more implementations may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 340 for performing the operations and steps discussed herein.

The computer system 300 may further include a network interface device 308. The computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse), and a signal generation device 322 (e.g., a speaker).

Power device 318 may monitor a power level of a battery used to power the computer system 300 or one or more of its components. The power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to the power device 318 may be accessible remotely (e.g., accessible to a remote back-up management module via a network connection). In some implementations, a battery utilized by the power device 318 may be an uninterruptable power supply (UPS) local to or remote from computer system 300. In such implementations, the power device 318 may provide information about a power level of the UPS.

The data storage device 320 may include a computer-readable storage medium 324 (e.g., a non-transitory computer-readable storage medium) on which is stored one or more sets of instructions 340 (e.g., software) embodying any one or more of the methodologies or functions described herein. These instructions 340 may also reside, completely or at least partially, within the main memory 304 and/or within the processor 302 during execution thereof by the computer system 300, the main memory 304, and the processor 302 also constituting computer-readable storage media. These instructions 340 may further be transmitted or received over a network 330 (e.g., the network 14) via the network interface device 308. While the computer-readable storage medium 324 is shown in an exemplary implementation to be a single medium, it is to be understood that the computer-readable storage medium 324 may include a single medium or multiple media (e.g., a centralized or distributed database, and/or associated caches and servers) that store the one or more sets of instructions 340.

Pipeline Architecture for Executing Computation Sequences

Figure 4:
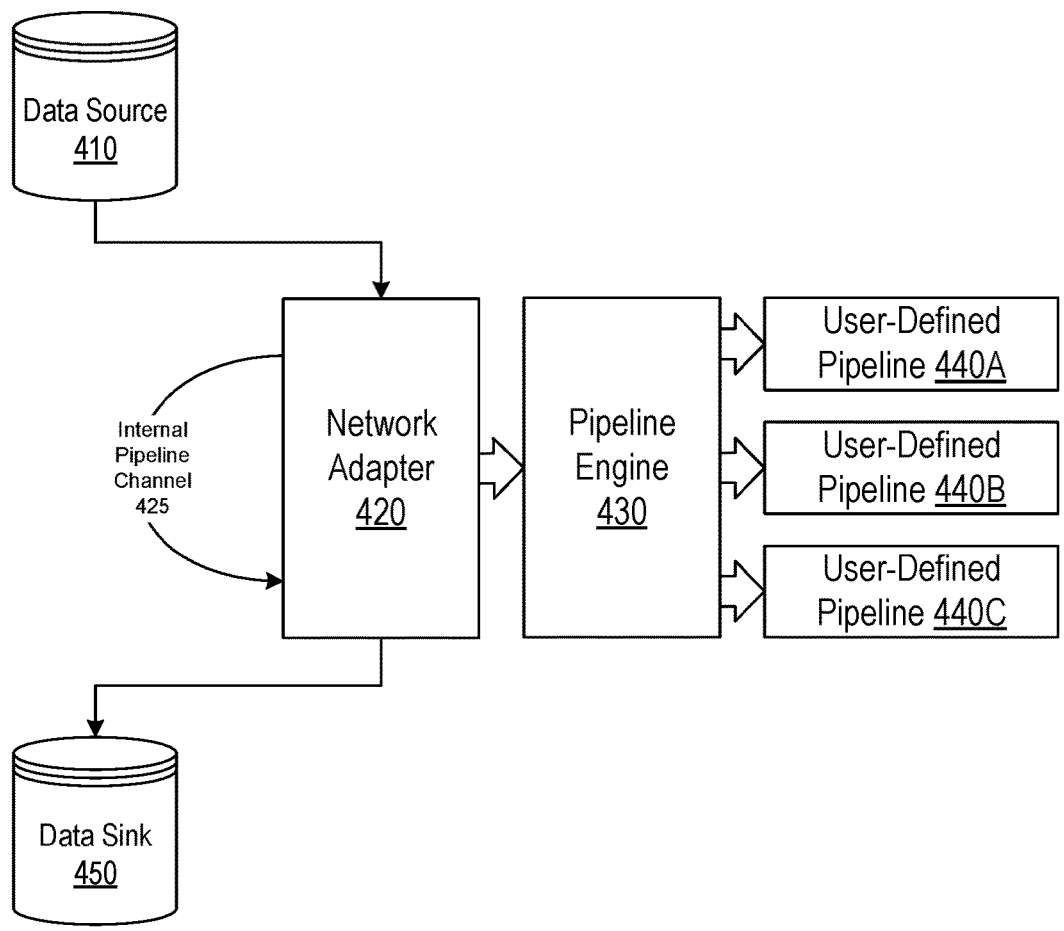
FIG. 4 illustrates an exemplary pipeline architecture for processing user-defined pipelines according to some implementations.

Referring now to FIG. 4, an exemplary pipeline architecture 400 for processing user-defined pipelines according to some implementations is illustrated. The data framework 400 illustrates a network adaptor 420, a pipeline engine 430, and one or more user-defined pipelines 440A-440C. In some implementations, the network adapter 420 is configured to ingest and transmit data to other devices across a communications network. For example, the network can read data from the communications network (which may include user requests to execute one or more user-defined pipelines 440A-440C) and deserialize the data into a pipeline dispatch request. A pipeline dispatch request is a message that identifies a pipeline (e.g., a user-defined pipeline to be executed) and has a format that facilitates sending stage-specific data between stage invocations by the pipeline engine 430. In some implementations, the network adapter 420 utilizes an internal pipeline channel 425 to transmit pipeline dispatch requests to other framework application instances. In some implementations, such framework application instances may handle the evaluation of deep learning models, communicate with external databases, or enable additional scaling to handle the evaluation and execution of user-defined pipelines 440A-440C.

In some implementations, the network adapter 420 then transmits the pipeline dispatch request to the pipeline engine 430. In some implementations, the pipeline engine 430 manages the execution of user-defined pipelines 440A-440C. The pipeline engine 430 may be capable of running multiple user-defined pipelines 440A-440C, as well as determining which pipeline to execute and how many steps/stages of the pipeline to execute. In some implementations, each node running the pipeline architecture 400 can implement a pipeline engine 430 to execute the user-defined pipelines 440A-440C. Once the pipeline engine 430 receives the pipeline dispatch request, the pipeline engine 430 can then fetch the corresponding user-defined pipeline and advance the dispatch request through the corresponding stage in the user-defined pipeline. In some implementations, the pipeline engine 430 decides whether to continue evaluating the dispatch request returned from the pipeline evaluation or send the dispatch request back to the network adapter 420. The logic by which the pipeline 430 makes these decisions is described in greater detail below with respect to FIG. 5.

In some implementations, the network adaptor 420 adapts the pipeline engine 430 to an underlying network communication pattern. This allows, for example, underlying communication technologies/networking frameworks to be swapped out with no impact on the user-defined pipelines 440A-440C. An advantage of the present implementations is the ability to abstract pipeline execution into the pipeline engine 430. For example, in some implementations, the pipeline engine provides a layer of abstraction between the user-defined pipelines 440A-440C and the network. In such implementations, one or more user-defined pipelines 440A-440C may be executed without any knowledge of which underlying network framework is used. This allows a user or a team of users running an application to determine what underlying networking framework they wish to use. For example, running the framework as a Kafka application versus a Storm application differs in terms of how the network adaptor 420 is implemented. A further advantage is that in some implementations, the pipeline engine 430 can forego network communication in favor of computing successive one or more successive stages of a user-defined pipeline locally. This allows for execution of user-defined pipelines that dramatically reduces network overhead. The logic for executing each user-defined pipeline 440A-440C may be the same and is implemented by the pipeline engine 430.

In some implementations, each of the user-defined pipelines 440A-440C are built from one or more stages. It is noted that the three user-defined pipelines are illustrative, and that at any given time an arbitrary number of user-defined pipelines may be accessible to the pipeline architecture 400. Each stage of a given pipeline is a user-defined function that maps an input type to an output type. The user can specify serialization routines that are implemented in between stages, and may be implemented at the beginning and end of the pipeline. In some implementations, the serialization routines allow the user to utilize any binary format for their data, including a customized format defined by the user.

In some implementations, information pertaining to the underlying network framework is not provided to the user or selectable as an option by the user at the time that the user generates their pipeline and request to execute the pipeline. For example, during and after execution of a user-defined pipeline, the system avoids providing data to the user descriptive of the underlying framework used. The network adapter 420 may benefit from such abstraction as it can remain unaware of the user-defined pipelines or the logic of the pipeline engine 430. The network adapter 420 behavior can be reduced to communication over the communications network and calling the pipeline engine 430 with data that has the network adaptor 420 has deserialized from the communications network. In such implementations, a network adaptor 420 written/generated for a particular framework, such as Apache Hadoop, could be usable for any set of user-defined pipelines, rendering the pipeline architecture 400 usable across multiple application settings.

Figure 5:
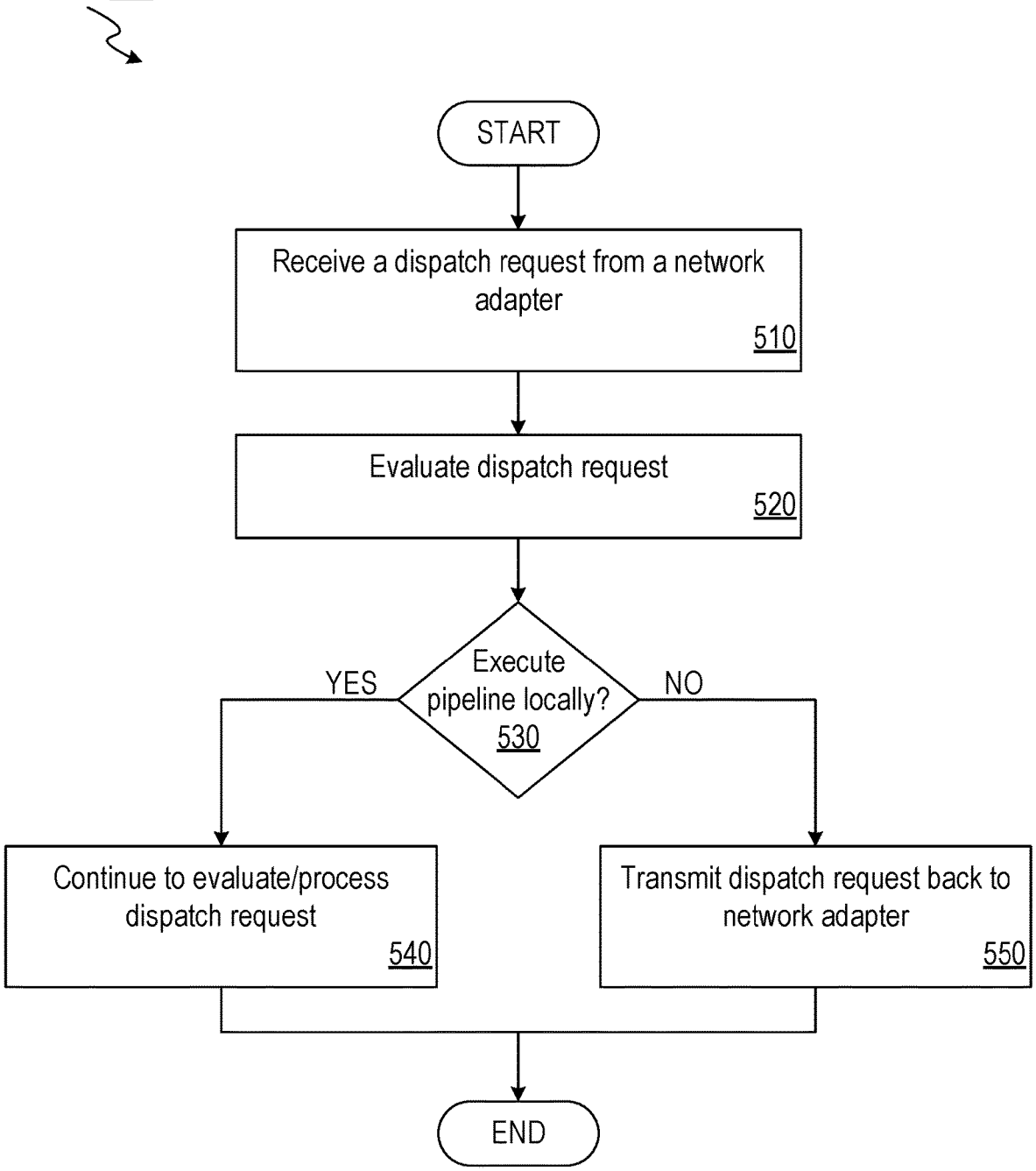
FIG. 5 is a flow diagram illustrating an exemplary method for processing dispatch requests from a network adapter according to some implementations.

Reference is now made to FIG. 5, which is a flow diagram illustrating an exemplary method 500 for processing dispatch requests from a network adapter according to some implementations. The method 500 may be performed by processing logic comprising hardware (e.g., circuitry, dedicated logic, programmable logic, microcode, etc.), software (such as instructions run on a processing device), or a combination thereof. In some implementations, the method 500 may be performed by a database system (e.g., the database system 16), and or a distributed data processing system implementing, for example, the pipeline architecture 400 via one or more processing devices. It is to be understood that these implementations are merely exemplary, and that other devices may perform some or all of the functionality described.

At block 510, the pipeline engine (e.g., the pipeline engine 430) receives a dispatch request from a network adapter (e.g., the network adaptor 420), which is descriptive of or identifies one or more user-defined pipelines (e.g., one or more of the user-defined pipelines 440A-440C).

At block 520, the pipeline engine evaluates the dispatch request. For example, in some implementations, the pipeline engine 430 may evaluate the dispatch request by advancing the associated user-defined pipeline through at least one stage.

At block 530, the pipeline engine determines whether the user-defined pipeline associated with the dispatch request should be executed locally by the pipeline engine, or if the dispatch request should be returned to the network adapter. In some implementations, the pipeline engine tracks the execution times of dispatch requests by itself or by other pipeline engines across the communications network. In some implementations, the pipeline engine computes an expected computation time based on measured network latencies. In some implementations, the pipeline engine may receive or retrieve metadata from messages exchanged between computational nodes. The pipeline engine may extract information from the metadata to estimate computational times for local computation, which may be used to determine whether local execution is more efficient than further serialization and deserialization. In some implementations, multiple servers may be implemented by the pipeline engine to execute one or more stages of the user-defined pipeline. Depending on the latency of each server, the pipeline engine may opt to have one server perform local execution more frequently than the other server, or may opt to transmit the dispatch request back to the network adapter to avoid overloading the servers.

In some implementations, by advancing the associated user-defined pipeline through at least one stage, the pipeline engine may estimate a total amount of time required to fully execute the user-defined pipeline.

The pipeline engine may utilize the tracked or estimated execution times to determine, on a per-pipeline basis, whether it is more efficient to locally execute of one or more stages of the user-defined pipeline or to transmit the dispatch request back to the network adapter to identify a different pipeline engine or device to execute the user-defined pipeline. For example, if average execution time for the stages of a given pipeline is around 1 millisecond and serialization time is 2 milliseconds, the pipeline engine can optimize execution time of the given pipeline by executing or continuing to execute multiple stages of the given pipeline locally. By locally executing the pipeline instead of transmitting the dispatch request to the network adapter, the pipeline engine can advantageously reduce the impact of serialization and deserialization on the overall end-to-end pipeline execution time. Further to the preceding example, a pipeline with three stages could save, for example, 8 milliseconds by continued local execution compared to transmitting the dispatch request back to the network adapter. This savings in execution time could translate into three additional complete pipeline executions for every two dispatch requests that are processed through their respective pipelines (i.e., a 150% speed increase).

In some situations, local execution by the pipeline engine may be less efficient than the overhead generated through serialization and deserialization. For example, this could be true in the situation where a given user-defined pipeline did not interact with external services such as deep learning models or databases. Interactions with external services are often more efficiently executed on a separate device than locally on the same device. For example, if a dispatch request is to be run through a deep learning model requiring specialized hardware, but only 5% of all dispatches require this hardware, it may be more time-efficient to send such dispatch requests to a device with specialized hardware rather than requiring all devices to have the specialized hardware (e.g., which can be an order of magnitude more expensive to run).

In some implementations, a user may at least partially override the decision logic at block 530, for example, by specifying that one or more stages of the user-defined pipeline are to be executed locally by the pipeline engine. In some implementations, the user may request at runtime that one or more stages of the pipeline engine be executed locally. In some implementations, the user may specify specific stages of the pipeline that are to be executed locally.

At block 530, if the pipeline engine determines that the user-defined pipeline is to be executed locally, then the method 500 proceeds to block 540 where the pipeline engine evaluates or continues to evaluate the dispatch request. Otherwise, the method proceeds to block 550, where the dispatch request is transmitted back to the network adapter, which may then select a separate pipeline engine or device to which the dispatch request is transmitted.

Figure 6:
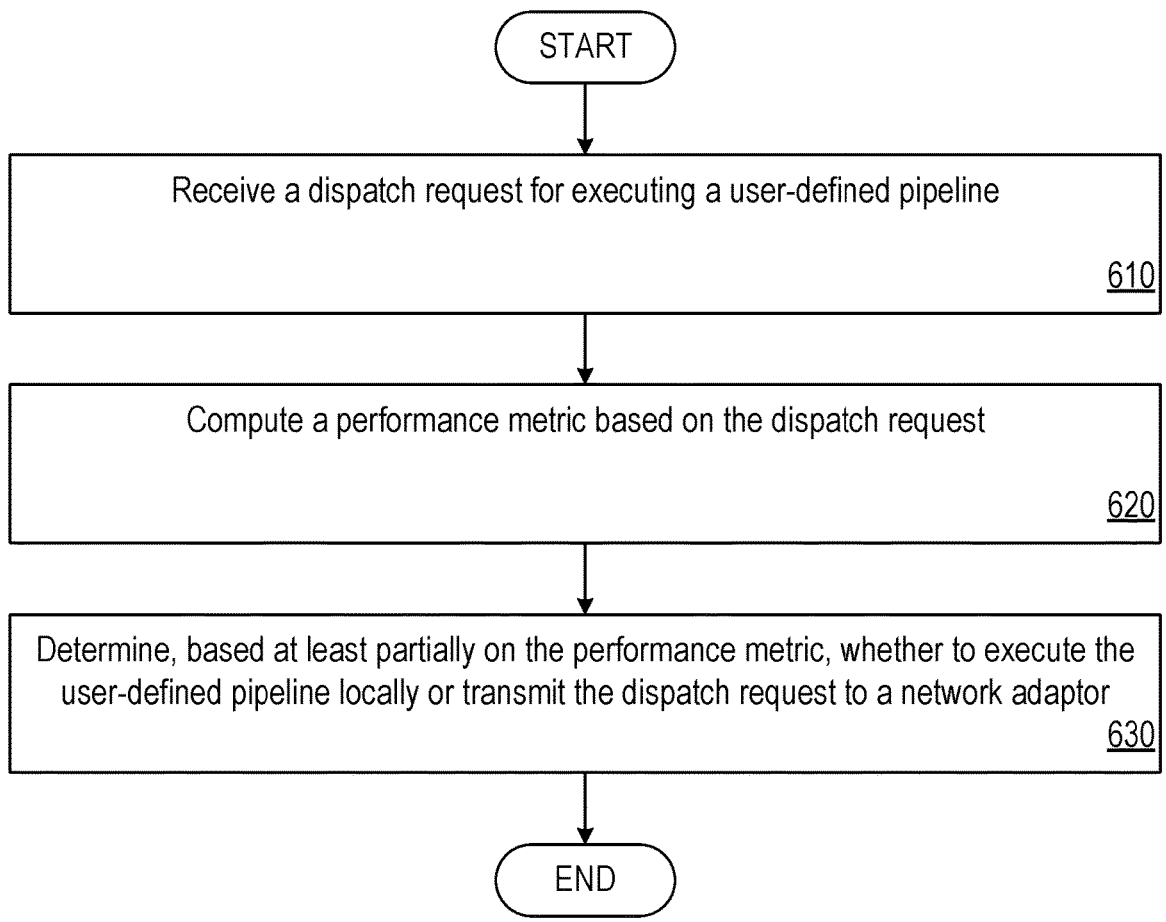
FIG. 6 is a flow diagram illustrating an exemplary method for performing sequences of computations in an infrastructure-agnostic manner according to some implementations.

Reference is now made to FIG. 6, which is a flow diagram illustrating an exemplary method 600 for performing sequences of computations in an infrastructure-agnostic manner according to some implementations. The method 600 may be performed by processing logic comprising hardware (e.g., circuitry, dedicated logic, programmable logic, microcode, etc.), software (such as instructions run on a processing device), or a combination thereof. In some implementations, the method 600 may be performed by a database system (e.g., the database system 16), and or a distributed data processing system implementing, for example, the pipeline architecture 400 via one or more processing devices. It is to be understood that these implementations are merely exemplary, and that other devices may perform some or all of the functionality described.

Referring to FIG. 6, at block 610, a pipeline engine (e.g., the pipeline engine 430) receives, from a network adapter (e.g., the network adapter 420), a dispatch request for executing a user-defined pipeline. In some implementations, the dispatch request is agnostic to an underlying network infrastructure by which the user-defined pipeline is to be executed.

In some implementations, the dispatch request is descriptive of a user request comprising the user-defined pipeline and one or more user-specified serialization routines to be performed at various stages in the user-defined pipeline.

At block 620, a performance metric is computed based on the dispatch request (e.g., by the pipeline engine). In some implementations, the performance metric is a network latency. The user-specific pipeline may be executed locally by the pipeline engine in response to determining that local execution is computationally faster or more efficient than the user-specific pipeline being transmitted by the network adapter to a different pipeline engine for execution. In some implementations, determining that local execution is computationally faster or more efficient than the user-specific pipeline being transmitted by the network adapter to a different pipeline engine for execution comprises estimating a local execution time based on an execution time of at least one stage of the user-specific pipeline by the pipeline engine.

At block 630, a determination is made, based at least partially on the performance metric, whether to execute the user-defined pipeline locally by the pipeline engine or transmit the dispatch request back to the network adapter.

In some implementations, one or more stages of the user-defined pipeline are executed locally by the pipeline engine based on a user-specified requirement. In some implementations, executing the user-defined pipeline locally by the pipeline engine includes requesting one or more external resources available to the pipeline engine to improve or optimize execution of the user-defined pipeline. In some implementations, the dispatch request is agnostic to the external resources requested.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring instructions for performing such methods to computing devices. The term "article of manufacture," as used herein, is intended to encompass a computer program accessible from any computer-readable device or storage media.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A computer-implemented method comprising:
receiving, from a network adapter by a pipeline engine of a pipeline architecture, a dispatch request for executing a user-defined pipeline, wherein the dispatch request is agnostic to an underlying network infrastructure by which the user-defined pipeline is to be executed;
computing a performance metric based on the dispatch request and by information extracted from metadata associated with messages exchanged between computational nodes of the pipeline architecture, the performance metric comprising at least an estimate of computational times for local execution;
executing one or more stages of the user-defined pipeline locally by the pipeline engine based on a user-specified requirement, wherein the user-specified requirement overrides decision logic of the pipeline engine in determining whether to execute the stages of the user-defined pipeline locally by the pipeline engine or transmit the dispatch request back to the network adapter; and
determining, based at least partially on the performance metric and an overhead generated through serialization and deserialization of transmitting the dispatch request back to the network adapter, whether to execute the remaining stages of the user-defined pipeline locally by the pipeline engine or transmit the dispatch request back to the network adapter, wherein transmitting the dispatch request requires serialization and deserialization of the dispatch request.

2. The computer-implemented method of claim 1, wherein the dispatch request is descriptive of a user request comprising the user-defined pipeline and one or more user-specified serialization routines to be performed at various stages in the user-defined pipeline.

3. The computer-implemented method of claim 1, wherein the performance metric is a network latency, and wherein the user-defined pipeline is executed locally by the pipeline engine in response to determining that local execution is computationally faster or more efficient than the user-defined pipeline being transmitted by the network adapter to a different pipeline engine for execution.

4. The computer-implemented method of claim 3, wherein determining that local execution is computationally faster or more efficient than the user-defined pipeline being transmitted by the network adapter to a different pipeline engine for execution comprises estimating a local execution time based on an execution time of at least one stage of the user-defined pipeline by the pipeline engine.

5. The computer-implemented method of claim 1, wherein executing the user-defined pipeline locally by the pipeline engine comprises requesting one or more external resources available to the pipeline engine to improve or optimize execution of the user-defined pipeline.

6. The computer-implemented method of claim 5, wherein the dispatch request is agnostic to the one or more external resources requested.

7. A distributed data processing system comprising:
one or more processors configured to implement a pipeline engine of a pipeline architecture and a network adapter; and
a memory device coupled to the one or more processors, the memory device having instructions stored thereon that, in response to execution by the one or more processors, cause the one or more processors to:
- receive, by the pipeline engine from the network adapter, a dispatch request for executing a user-defined pipeline, wherein the dispatch request is agnostic to an underlying network infrastructure by which the user-defined pipeline is executed;
- compute a performance metric based on the dispatch request and by information extracted from metadata associated with messages exchanged between computational nodes of the pipeline architecture, the performance metric comprising at least an estimate of computational times for local execution;
- execute one or more stages of the user-defined pipeline locally by the pipeline engine based on a user-specified requirement, wherein the user-specified requirement overrides decision logic of the pipeline engine in determining whether to execute the stages of the user-defined pipeline locally by the pipeline engine or transmit the dispatch request back to the network adapter; and
- determine, based at least partially on the performance metric and an overhead generated through serialization and deserialization of transmitting the dispatch request back to the network adapter, whether to execute the remaining stages of the user-defined pipeline locally by the pipeline engine or transmit the dispatch request back to the network adapter, wherein transmitting the dispatch request requires serialization and deserialization of the dispatch request.

8. The distributed data processing system of claim 7, wherein the dispatch request is descriptive of a user request comprising the user-defined pipeline and one or more user-specified serialization routines to be performed at various stages in the user-defined pipeline.

9. The distributed data processing system of claim 7, wherein the performance metric is a network latency, and wherein the user-defined pipeline is to be executed locally by the pipeline engine in response to determining that local execution is computationally faster or more efficient than the user-defined pipeline being transmitted by the network adapter to a different pipeline engine for execution.

10. The distributed data processing system of claim 9, wherein to determine that local execution is computationally faster or more efficient than the user-defined pipeline being transmitted by the network adapter to a different pipeline engine for execution, the one or more processors are to further estimate a local execution time based on an execution time of at least one stage of the user-defined pipeline by the pipeline engine.

11. The distributed data processing system of claim 7, wherein to execute the user-defined pipeline locally by the pipeline engine, the one or more processors are to further request one or more external resources available to the pipeline engine to improve or optimize execution of the user-defined pipeline.

12. The distributed data processing system of claim 11, wherein the dispatch request is agnostic to the one or more external resources requested.

13. A non-transitory computer-readable storage medium having instructions encoded thereon which, when executed by one or more processing devices of a distributed data processing system, cause the one or more processing devices to:
- receive, from a network adapter by a pipeline engine of a pipeline architecture, a dispatch request for executing a user-defined pipeline, wherein the dispatch request is agnostic to an underlying network infrastructure by which the user-defined pipeline is executed;
- compute a performance metric based on the dispatch request and by information extracted from metadata associated with messages exchanged between computational nodes of the pipeline architecture, the performance metric comprising at least an estimate of computational times for local execution;
- execute one or more stages of the user-defined pipeline locally by the pipeline engine based on a user-specified requirement, wherein the user-specified requirement overrides decision logic of the pipeline engine in determining whether to execute the stages of the user-defined pipeline locally by the pipeline engine or transmit the dispatch request back to the network adapter; and
- determine, based at least partially on the performance metric and an overhead generated through serialization and deserialization of transmitting the dispatch request back to the network adapter, whether to execute the remaining stages of the user-defined pipeline locally by the pipeline engine or transmit the dispatch request back to the network adapter, wherein transmitting the dispatch request requires serialization and deserialization of the dispatch request.

14. The non-transitory computer-readable storage medium of claim 13, wherein the dispatch request is descriptive of a user request comprising the user-defined pipeline and one or more user-specified serialization routines to be performed at various stages in the user-defined pipeline.

15. The non-transitory computer-readable storage medium of claim 13, wherein the performance metric is a network latency, and wherein the user-defined pipeline is to be executed locally by the pipeline engine in response to determining that local execution is computationally faster or more efficient than the user-defined pipeline being transmitted by the network adapter to a different pipeline engine for execution.

16. The non-transitory computer-readable storage medium of claim 15, wherein to determine that local execution is computationally faster or more efficient than the user-defined pipeline being transmitted by the network adapter to a different pipeline engine for execution, the one or more processing devices are to further estimate a local execution time based on an execution time of at least one stage of the user-defined pipeline by the pipeline engine.

17. The non-transitory computer-readable storage medium of claim 13, wherein to execute the user-defined pipeline locally by the pipeline engine, the one or more processing devices are to further request one or more external resources available to the pipeline engine to improve or optimize execution of the user-defined pipeline, and wherein the dispatch request is agnostic to the one or more external resources requested.

* * * * *